United States Patent [19]

Borin et al.

[11] 4,346,254

[45] Aug. 24, 1982

[54] TEST STATION APPARATUS FOR FLUSH MOUNTING

[76] Inventors: Frank W. Borin, 2552 Almaden Ct., Bel Air, Calif. 90024; Jeffrey G. Thomas, 17800 Rayen, Northridge, Calif. 91423

[21] Appl. No.: 145,941

[22] Filed: May 2, 1980

Related U.S. Application Data

[63] Continuation-in-part of Ser. No. 19,989, Mar. 12, 1979, abandoned.

[51] Int. Cl.³ .............................................. H02G 9/10
[52] U.S. Cl. ....................................... 174/37; 174/59; 422/43
[58] Field of Search ..................... 174/37, 38, 39, 59, 174/60, 75 B; 137/364, 371; 220/216, 217, 228; 405/53; 422/43

[56] References Cited

U.S. PATENT DOCUMENTS

| | | | |
|---|---|---|---|
| 543,613 | 7/1895 | Cummings | 174/37 |
| 3,055,970 | 9/1962 | Handley | 174/37 |
| 3,127,235 | 3/1964 | Benzel | 422/43 X |
| 3,466,379 | 9/1969 | Lohman | 174/38 |
| 3,466,380 | 9/1969 | Baumgartner et al. | 174/38 |
| 3,482,030 | 12/1969 | Wisniewski | 174/37 |
| 3,595,983 | 7/1971 | Muller et al. | 174/31.5 |

FOREIGN PATENT DOCUMENTS

| | | | |
|---|---|---|---|
| 699502 | 11/1940 | Fed. Rep. of Germany | 174/38 |
| 1640769 | 12/1970 | Fed. Rep. of Germany | 174/38 |

*Primary Examiner*—Laramie E. Askin

*Attorney, Agent, or Firm*—Thomas H. Murray; Clifford A. Poff

[57] ABSTRACT

An electrical current of potential is fed to or measured in test leads associated with underground piping, casings and the like through the use of a cathodic test station for flushing mounting in the ground. The test station includes a hollow cylindrical housing having a flanged upper end and an implanted lower end receiving test leads and anchored in the ground by a bar extending therethrough and by ribs projecting radially from the outer surface of the housing. A carrier forms an airtight pocket within side walls projecting from a solid end wall having a flange extending outwardly for recessed support on a shelf in the flanged upper end of the housing. A clamp within the airtight pocket of the carrier supports a terminal block. In one form, the clamp is produced by protrusions from the side wall of the carrier and in another form, a clip extends across the face of the end wall of the carrier. Ends of the clip are spaced from the end wall to support a mounting wall of a terminal block member. The mounting wall has a configuration to pass beyond the protrusions or ends of the clip so that rotation of the terminal block member moves an inclined support surface into a tightly-fitting engagement between the end wall and the protrusions or clip. Entrapped air in the airtight pocket of the carrier prevents ingress of water. A fastener releasably secures the carrier to the housing. A strip of oil impregnated felt, sponge rubber or foamed plastic is used to release oil to suppress vaporization and condensation of subsurface water.

19 Claims, 8 Drawing Figures

TEST STATION APPARATUS FOR FLUSH MOUNTING

CROSS-REFERENCE TO RELATED APPLICATION

This application is a continuation-in-part of application Ser. No. 19,989, filed Mar. 12, 1979, now abandoned.

BACKGROUND OF THE INVENTION

This invention relates to a cathodic test station apparatus for mounting in a flush relation with the ground surface and including a removable member to provide access to test leads coupled to terminals on a block member that is housed and may be removably supported within an airtight pocket formed in the removable member. The present invention also provides such a cathodic test station apparatus embodying anchoring members to not only maintain the desired flush-mounting arrangement but also to prevent rotation of the implanted apparatus, a major part of which is made of plastic material for noncorrosive and electrically protective use.

A cathodic test station is used to provide aboveground access to lead wires for monitoring of electrical currents and potentials associated with numerous types of underground piping, casings and other metallic structures. The test station provides terminals to which the leads are connected for measuring underground structure-to-soil potentials, cathodic protection anode currents, the resistive integrity of insulation between various types of underground structures including a pipe, its casing or carrier. Such test stations are also used to detect and measure stray electrical currents in underground or subterranean structures as well as for reading electrical potential.

When a test station apparatus is made of cast aluminum, it is subject to destructive corrosion and offers no protection to personnel against electrical shock. A test station of this type, when embedded in streets or sidewalks, becomes filled with surface and subsurface water, causing deterioration of the internal parts. At subfreezing temperatures, the formation of ice prevents access to the terminals and breakage of the cast structure. Even if plastic material is used to form the test station, the ingress of water deteriorates the bared ends of lead wires and test terminals. The formation of ice within the test station prevents access to the terminals.

SUMMARY OF THE INVENTION

It is an object of the present invention to provide a cathodic test station apparatus formed by a flush-mounted load-bearing subterranean structure including a removable member forming an airtight pocket wherein a terminal support member is protectively positioned and/or carried for coupling to leads extending beneath the ground surface.

It is a further object of the present invention to provide a cathodic test station apparatus embodying an improved anchor arrangement to not only maintain the apparatus at the desired flush-mounting relation with the ground but at the same time prevent rotary movement of the test station apparatus about a vertical axis for protection against damage to the apparatus and test leads when coupled to the apparatus.

It is still a further object of the present invention to provide a cathodic test station apparatus wherein plastic material is used to form the essential parts of the apparatus to provide protection for users of the apparatus against electrical shock and at the same time embody a design to prevent the infiltration of water into the apparatus by providing an airtight pocket in a carrier for a terminal board that is removably supported in a housing.

It is another object of the present invention to provide a cathodic test station apparatus formed by a subterranean structure adapted for flush mounting and including means for supplying a substance to suppress vaporization of subsurface water and avoid condensation of water vapor within a pocket defined by part of the apparatus.

More particularly, according to the present invention there is provided a cathodic test station apparatus for coupling conductor leads extending from piping, a casing, an anode, the soil and the like to a device to measure and/or supply an electrical current or potential for cathodic protection, the apparatus comprising a generally hollow housing having a flanged upper end for extending essentially flush with the ground surface for access from aboveground after subterranean implantation such that the lower end extends into the ground for protectively receiving conductor leads passed into the housing, an enclosure member defining an airtight pocket within side wall means projecting from a solid end wall and having a flange extending outwardly therefrom for recessed support by the flanged upper end of the housing, and a terminal block member extending within the airtight pocket of the enclosure member, the terminal block member including a terminal carrier plate and a wall support to extend within the airtight pocket of the enclosure member when supported by the housing such that entrapped air in the airtight pocket thereof prevents ingress of water.

Clamp means in the enclosure member can be used to releasably retain the terminal block member engaged with the enclosure member. By this construction, the enclosure member can be removed together with the terminal block member having wire leads attached thereto extending through the housing into the ground. More specifically, the enclosure member supports clamp means having a support surface projecting into the airtight pocket at a spaced-apart relation from the solid end wall thereof. The terminal block member includes a mounting wall having a configuration to pass beyond the support surface of the clamp means and for coming into retaining engagement therewith upon rotation within the airtight pocket.

In the preferred form, the aforesaid housing has a generally tubular configuration and the enclosure member forms a carrier with a generally cylindrical outer wall to fit within the housing. Means, such as sponge rubber, felt or foamed plastic, is adhered to the apparatus below ground level to release an impregnated supply of oil or other material into any subsurface water to suppress vaporization and avoid the formation of condensation within the airtight pocket. To prevent rotation of the housing in the ground, radially-projecting ribs extend at spaced-apart locations along the substantial part of the outer surface of the housing. An anchor rod supported by the lower end of the housing extends outwardly into the ground for maintaining the upper end of the housing flush with the ground. In the airtight pocket of the carrier, an array of support surfaces extends from the end wall to engage the mounting wall of the terminal block. The clamp may take the form of a protruding wall segment or a separately insertable clip having a back section with a depending section at opposite ends each having a support web for releasable engagement with the mounting wall. The back section of the clip extends along the end wall of the carrier where a recess is preferably formed in an array of support surfaces. Implanted in the end wall is a magnetic insert at a site where it can be retained in place by the back section of the clip for detecting the implantation site of the housing through a metal detector. The housing includes a support ledge within the upper end thereof to receive the flange of the carrier. The housing further includes an internal ledge to support the lower end of the carrier to thereby provide structural integrity and withstand imposed loads by vehicle traffic aboveground.

These features and advantages of the present invention as well as others will be more fully understood when the following description of the preferred embodiments is read in light of the accompanying drawings, in which.

Figure 1:
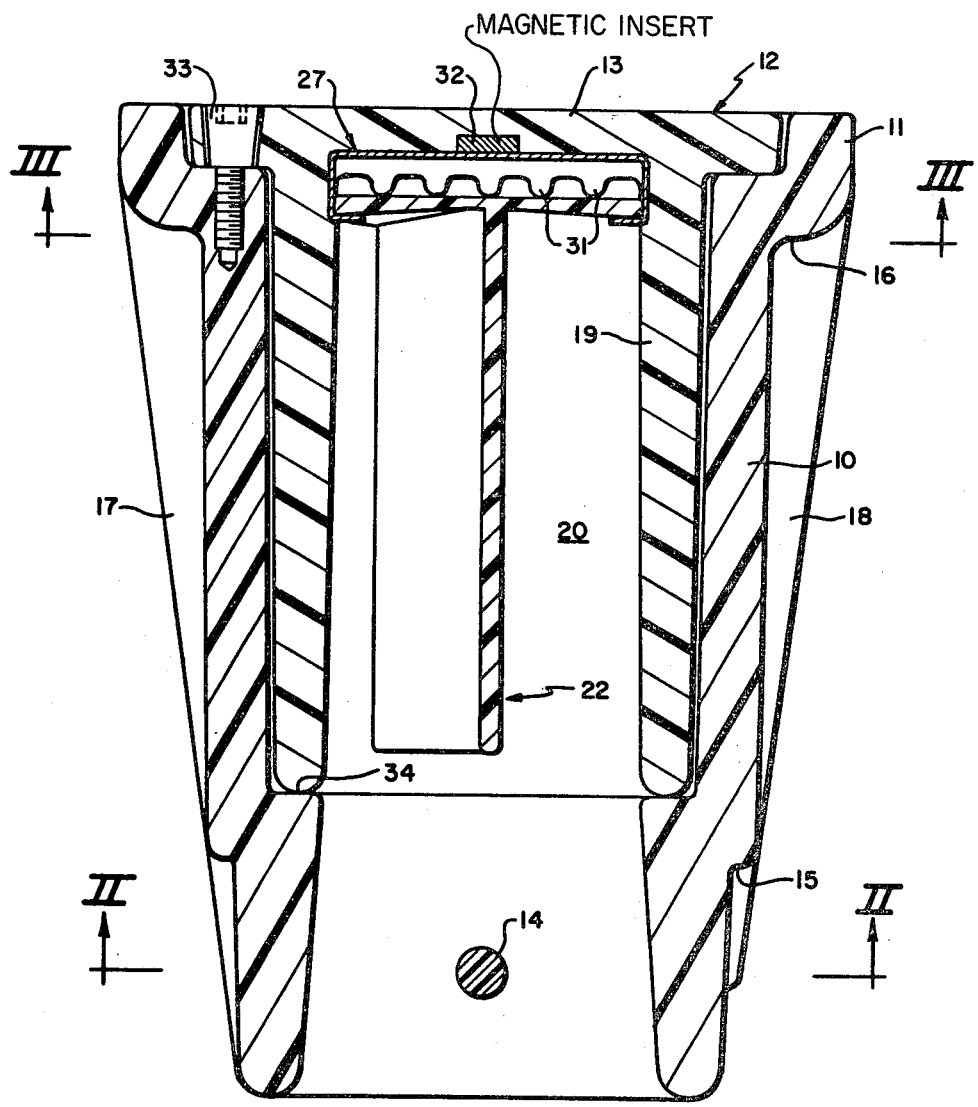
FIG. 1 is an elevational view, in section, through one embodiment of a cathodic test station apparatus of the present invention.
Figure 2:
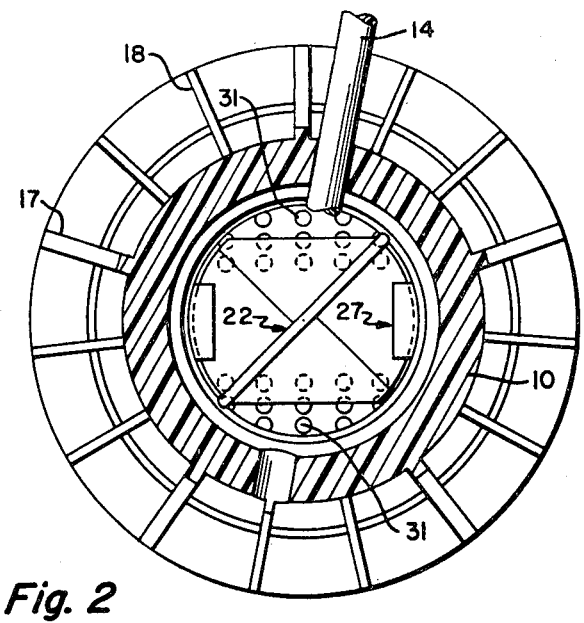
FIG. 2 is a sectional view taken along line II—II of FIG. 1.
Figure 3:
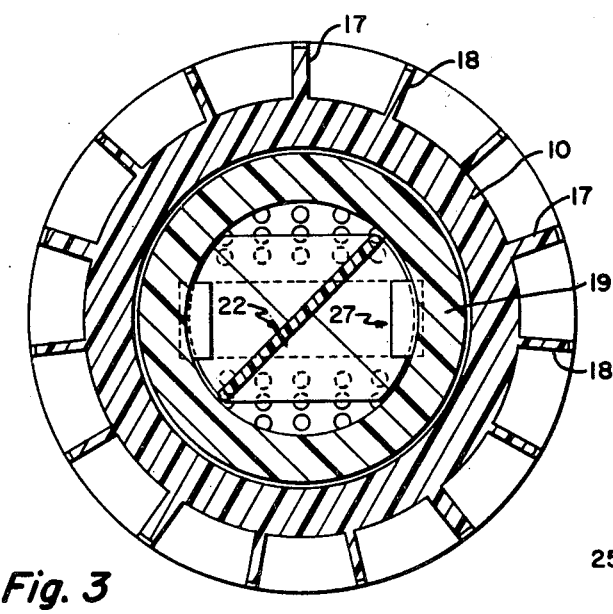
FIG. 3 is a sectional view taken along line III—III of FIG. 1.

As shown in FIGS. 1-3, the embodiment of the cathodic test station apparatus of the present invention includes a generally tubularly-shaped housing 10 with the upper end thereof enlarged by a flange 11 which forms a shelf recess on which a flange of an enclosure member or carrier 12 is supported. As will be described in greater detail hereinafter, the carrier includes a solid end wall 13 which is supported by the outwardly-extending flange to form a nested flush relation in the shelf recess in the housing 10. When implanted in the ground, the upper ends of the housing and carrier are radially positioned in flush relation with the surface of the ground. This avoids excessive impact loading upon the test station by a vehicle or other traffic moving along the surface of the ground. An anchor tube or rod 14 is passed through an opening at each of diametrically opposite sites at the lower end of the housing 10 to extend outwardly therefrom into the soil and prevent a raising or lowering of the housing at the implantation site. The housing also includes a lower shelf surface 15 and an upper shelf surface 16 forming additional load-bearing surfaces primarily against the downward movement of the housing. Large ribs 17 and small ribs 18 extend radially at spaced-apart locations from the outer side wall surface of the housing forming cavity areas therebetween into which soil is received to form an anchor against rotation by the housing about a vertical axis. This anchoring of the housing resists an imposed force on one upper edge of the housing tending to produce rotation.

Figure 4:
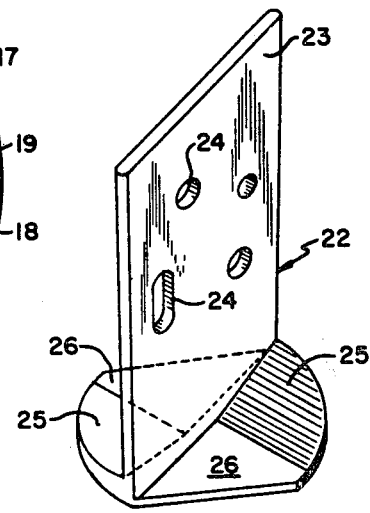
FIG. 4 is an isometric view of a terminal plate member forming part of the test station apparatus shown in FIG. 1.

The carrier 12 is a unitary member with a tubular wall section 19 extending from the end wall 13. The space enclosed by the tubular wall and end wall forms an airtight pocket 20 into which there is releasably received a terminal block member 22. As best shown in FIG. 4, but also shown in FIGS. 1-3, the terminal block member 22 includes a carrier plate 23 having a plurality of openings such as shown at 24 to receive terminal members, not shown, for the attachment of test leads fed into the housing 10 and passed therealong into the airtight pocket 20. The carrier plate projects from a lateral base or mounting wall made up of arcuate segments 25 and 26 at each side of the plate. Each segment 25 has an inclined face surface formed by a progressively increased thickness to the segment. The smallest thickness of segment 25 is extended by segment 26 having a uniform thickness. The inclined face surfaces of segments 25 lie at opposite sides of plate 23. The segments 26 have flats forming outer side edges that extend between annular edges of segments 25. The terminal block member 22 is releasably attached within the airtight pocket 20 by passing, as a leading end, the portion of the base or mounting wall made up of segments 25 and 26 into the airtight pocket with the flat side edges of segments 26 arranged to pass between projected ends of a clamp means or clip member 27.

Figure 5:
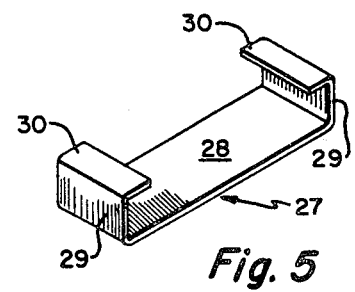
FIG. 5 is an isometric view of the clip member forming a support clamp for the terminal plate member shown in FIG. 4.

As shown in FIG. 5, the clip essentially comprises a back section 28 having at its opposite ends upstanding side walls 29 that carry reverse bent portions 30. The bent portions 30 form the support surfaces which, after the base or mounting wall of the terminal block member is inserted beyond the edges, are brought first into engagement with the uniformly thick sections 26 and thence upon continued rotation with the inclined surface of segments 25. The back section 28 of the clip extends along a recess within an array of projecting support knobs or surfaces 31. These support surfaces engage the back surface of the base of the terminal block member. The back plate section 28 of the clip overlies one exposed face surface of an insert 32 made of magnetic ceramic material. The insert 32 is used to locate the site of the test station apparatus in the event the top surface thereof is not readily detachable. A threaded fastener 33 includes, for example, a bolt extending into the side wall of housing 10 and receives at its upper end a nut passed into a suitably dimensioned opening in the flange of the carrier. The fastener 33 is used to maintain the carrier in a supported position within the housing in which the carrier is preferably dimensioned so that the bottom end thereof engages a ledge 34 used to provide additional load-bearing support for the carrier. The fastener 33 is also used to prevent displacement of the carrier from the housing due to a buoyant force created by the airtight pocket 20 should water infiltrate into the housing 10. In this way, the fastener prevents the carrier from simply floating on the surface of the water and rising out of the housing as the water level increases.

Figure 6:
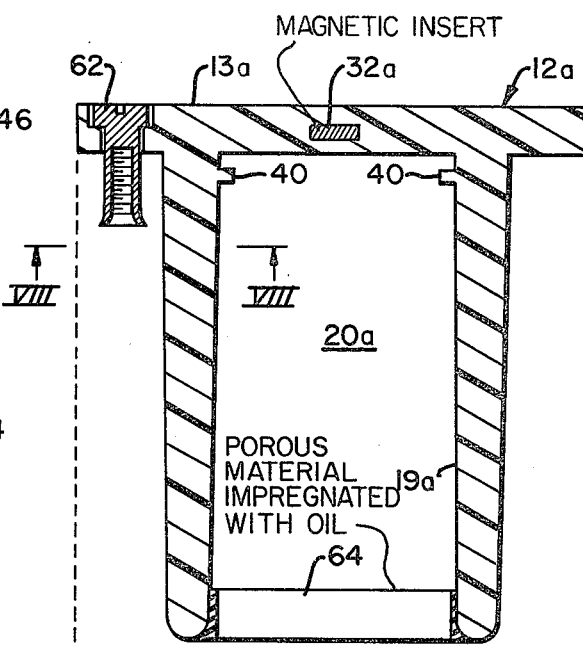
FIG. 6 is an exploded view of a second embodiment of the test station apparatus.
Figure 8:
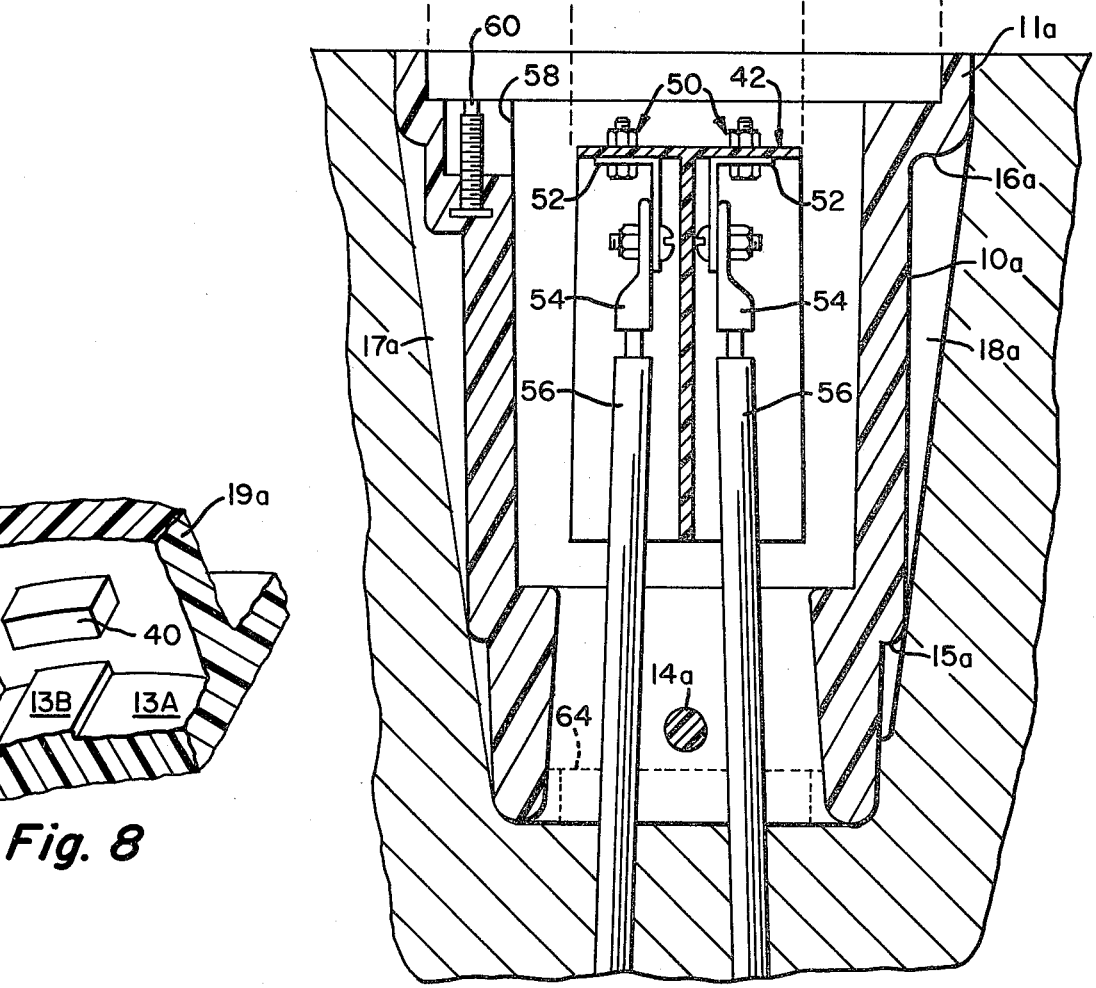
FIG. 8 is a partial isometric view taken along line VIII—VIII of FIG. 6 to illustrate a modified form of the clamp.

FIGS. 6 and 8 illustrate modifications to the test station apparatus described above. In these figures, the parts which are similar to the parts in FIGS. 1-5 are designated with corresponding numerals but having the suffix "a". The modifications include integrating the clamp means or clip member with the carrier 12. More specifically, instead of employing a discrete metallic clip member as shown in FIG. 5, the side walls 19a of the carrier 12a have projecting clamp means 40 at diametrically-opposite sites within the airtight pocket 20a. The projecting clamp means are preferably formed by molded protrusions from the side wall 19a that function in an essentially same manner as bent protrusions 30 and form support surfaces for the terminal block member 22. This member is attached within the airtight pocket by passing, as a leading end, the portion of the base or mounting wall made of segments 25 and 26 into the airtight pocket with the flat side edges of segments 26 arranged to pass between the projected face surfaces of clamp means 40. The terminal block member is then rotated so that support surfaces 26 come into retaining engagement with the clamp means 40 within the airtight pocket. It will be observed from FIG. 8 that the surface of end wall 13a within the airtight pocket 20a is formed with a flat face area 13A divided into segments by raised pad portions 13B. The raised pad portions 13B engage with the back face surface of segments 25 and 26. However, if desired, the raised pad portions 13B may be eliminated whereby the face of wall 13a within the airtight pocket is a smooth flat surface.

Figure 7:
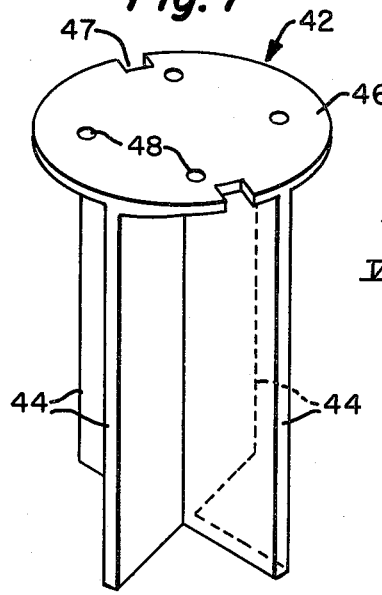
FIG. 7 is an isometric view of a modified form of the terminal plate member for a test station apparatus.

FIGS. 6 and 7 illustrate a modification to the terminal block member. The terminal block member 42 embodies an X-shaped arrangement of partition walls 44 forming electrically-isolated, arcuately-shaped attachment spaces for electrical leads. The walls 44 are joined along mutually-extending side edges and carry an end mounting plate 46 having openings 48. Each openings 48, as shown in FIG. 6, receives a mounting bolt and nut assembly 50 for attaching an L-shaped conductor strip 52. The conductor strip is, in turn, attached by a threaded nut and bolt assembly to a connector 54 that is secured onto the bared end of a lead wire 56. While four holes 48 are shown, each communicating with an arcuate partitioned space defined by walls 44, it is to be understood that various other arrangement of parts for the terminal block member 42 may be provided to achieve a desired mounting arrangement for terminal leads. The terminal block member is particularly useful for attachment to terminal leads that offer such a high degree of resistance against bending so as to impede or even render impossible a lifting of the carrier from the housing with the terminal block member attached to the carrier. In this regard, for example, a soil condition at a given site may be of such high resistivity so as to require the use of #4 or even heavier copper wire for adequate measurements of underground structure-to-soil potentials. Sometimes very low resistivity of soil brings about the need for such relatively heavy or large wire leads. Moreover, when the length of a wire lead is excessively long, a heavy, large copper wire is necessary to deliver anode or other cathodic protection currents. Under these circumstances, the clamp means, no matter how robustly constructed, and the terminal block member cannot withstand the forces required for interlocked support during lifting of the carrier from its nested relation within the housing 10a. To avoid possible damage to the parts of the apparatus, the modified embodiment of the present invention shown in FIG. 6 provides that the terminal block member 42 is supported by its attachment to relatively stiff wire leads at an elevation so that the airtight pocket 20a of carrier 12a can receive the terminal block member without disturbing its position within the housing. In FIG. 7, reference numeral 47 identifies notches formed in plate 46 that function in essentially the same manner as the flats on segments 26 of terminal block member 22.

FIG. 6 illustrates a preferred form of a threaded fastener to maintain the carrier in a supported position within the housing. The housing 10a is formed with a pocket 58 to open out of the ledge against which the flange of the carrier member rests when the carier is inserted in the housing. A threaded stud 60 is supported to extend within the pocket such that an exposed threaded portion can be received in the threaded opening of a nut member 62. The nut member is retained in an opening formed in the flange of the carrier member. The opening is dimensioned so that an enlarged head portion is flush with the top surface of end wall 13a. The enlarged head has a slot to form surfaces for rotating the nut member. The threaded end of the nut member is flared outwardly to prevent disengagement from the carrier.

Means 64, shown in FIG. 6, are preferably provided to suppress vaporization of any subsurface water and avoid the formation of condensation within the airtight pocket 20 or 20a when the carrier is supported by the housing. It is to be understood that the means 64 can be attached and supported by the opening at the lower end of housing 10 or 10a in the vicinity of anchor rod 14 or 14a, for example. The means 64 include a carrier strip made of material such as sponge rubber, felt or foamed plastic. The strip is impregnated with oil or other material for release into any subsurface water reaching the level of the means 64. A film of dispersed oil or other material is thus produced on the surface of any water within the housing such that vaporization is not likely to occur.

Although the invention has been shown in connection with certain specific embodiments, it will be readily apparent to those skilled in the art that various changes in form and arrangement of parts may be made to suit requirement without departing from the spirit and scope of the invention.

We claim as our invention:

1. A cathodic test station apparatus for coupling conductor wires extending from a pipe, a casing, an anode, the soil or the like to a device to measure, supply or respond to an electrical current or potential comprising stiff conductor leads having a high resistance to bending, a generally hollow housing having a flanged upper end for extending essentially flush with the ground surface for access from aboveground after subterranean implantation of the side wall thereof such that the lower end extends into the ground and protectively surrounds end portions of said conductor leads within the housing, an enclosure member defining an airtight pocket within side wall means projecting from a solid end wall and having a flange extending outwardly therefrom for recessed support by the flanged upper end of said housing, said enclosure member having a one-piece construction to loosely fit within said housing and unsupported by the side wall thereof, a terminal block member including a terminal carrier plate, and fasteners to hold said conductor leads on said terminal carrier plate, said terminal block member being supported essentially only by said stiff conductor leads to remain in said hollow housing for access to the conductor leads from aboveground without withdrawing the terminal block member from said housing, said terminal block member having a configuration to hold the conductor leads within the airtight pocket of said enclosure member such that the airtight pocket of the enclosure member when supported by said housing prevents ingress of water into the enclosure member by entrapped air therein.

2. The cathodic test station apparatus according to claim 1 wherein said housing has a generally tubular configuration, and wherein said enclosure member has a generally cylindrical outer wall surface to fit into said housing.

3. The cathodic test station apparatus according to claim 1 further including means supported by said housing below ground level for suppressing vaporization of subsurface water and condensation within said airtight pocket.

4. The cathodic test station apparatus according to claim 1 further including means carried by said enclosure member to extend below ground level for suppressing vaporization of subsurface water and condensation within said airtight pocket.

5. The cathodic test station apparatus according to claim 1 further including fastening means to releasably interconnect said housing and said enclosure member.

6. The cathodic test station apparatus according to claim 5 wherein said fastening means include a threaded stud member supported by said housing, and a nut member rotatably supported by said enclosure member.

7. The cathodic test station apparatus according to claim 1 wherein said terminal carrier plate includes an "X" configuration of support walls having mutually-adjoined side edges.

8. The cathodic test station apparatus according to claim 1 wherein said housing includes an internal ledge to support the lower end of said enclosure member.

9. A cathodic test station apparatus for coupling conductor leads extending from a pipe, a casing, an anode, the soil or the like to a device to measure, supply or respond to an electrical current or potential comprising a generally hollow housing having a flanged upper end for extending essentially flush with the ground surface for access from aboveground after subterranean implantation such that the lower end extends into the ground for protectively receiving test leads passed into the housing, a carrier defining an airtight pocket within side wall means projecting from a solid end wall and having a flange extending outwardly therefrom for recessed support by the flanged upper end of said housing, clamp means supported by said carrier, said clamp means having a support surface projecting into the airtight pocket of said carrier at a spaced relation from the solid end wall thereof, a terminal block member for support within the airtight pocket of said carrier, said terminal block member including a mounting wall having a configuration to pass beyond the support surface of said clamp means and for coming into retaining engagement therewith upon rotation within the airtight pocket, and said terminal block member further including a terminal carrier plate extending from the mounting wall thereof to extend within the airtight pocket of said carrier such that the airtight pocket of the carrier prevents ingress of water into the carrier by entrapped air therein.

10. The cathodic test station apparatus according to claim 9 wherein said housing has a generally tubular configuration, and wherein said carrier has a generally cylindrical outer wall surface to fit into the housing.

11. The cathodic test station apparatus according to claim 9 wherein said housing includes radially-projecting and spaced-apart ribs substantially along the length of the outside surface thereof to anchor against rotation in the ground after subterranean implantation.

12. The cathodic test station apparatus according to claim 11 further including an anchor rod supported by the lower end of said housing to extend outwardly into the ground for maintaining the upper end of the housing flush with the ground.

13. The cathodic test station apparatus according to claim 9 wherein the end wall of said carrier includes an array of support surfaces extending from said end wall into said airtight pocket to engage the mounting wall of said terminal block member.

14. The cathodic test station apparatus according to claim 13 wherein said clamp means includes a cross wall extending between said support surfaces on the end wall of the carrier.

15. The cathodic test station apparatus according to claim 9 wherein said clamp means comprises a back section with a depending section at opposite ends each having a support web for releasable engagement with said mounting wall.

16. The cathodic test station apparatus according to claim 9 or 15 further comprising a magnetic insert implanted within the end wall of said carrier and retained by said clamp means for detecting the implantation site of said housing.

17. The cathodic test station apparatus according to claim 9 wherein said housing includes a support ledge within the upper end thereof to receive the flange of said carrier.

18. The cathodic test station apparatus according to claim 9 or 17 further comprising fastening means to releasably interconnect said housing and said carrier.

19. The cathodic test station apparatus according to claim 9 wherein said housing includes an internal ledge to support the lower end of said carrier.

* * * * *